United States Patent
Fitzpatrick et al.

(10) Patent No.: US 10,443,417 B2
(45) Date of Patent: Oct. 15, 2019

(54) CERAMIC MATRIX COMPOSITE RING SHROUD RETENTION METHODS-FINGER SEALS WITH STEPPED SHROUD INTERFACE

(71) Applicant: General Electric Company, Schenectady, NY (US)

(72) Inventors: Dylan James Fitzpatrick, Peabody, MA (US); Christopher Paul Tura, Nahant, MA (US)

(73) Assignee: General Electric Company, Schenectady, NY (US)

( * ) Notice: Subject to any disclaimer, the term of this patent is extended or adjusted under 35 U.S.C. 154(b) by 500 days.

(21) Appl. No.: 14/858,529

(22) Filed: Sep. 18, 2015

(65) Prior Publication Data

US 2017/0081968 A1   Mar. 23, 2017

(51) Int. Cl.
*F01D 9/04* (2006.01)
*F02C 7/20* (2006.01)
(Continued)

(52) U.S. Cl.
CPC ......... *F01D 9/042* (2013.01); *F01D 9/041* (2013.01); *F01D 11/005* (2013.01);
(Continued)

(58) Field of Classification Search
CPC ...... F01D 25/24; F01D 25/246; F01D 25/243; F01D 9/041; F01D 9/042; F01D 11/005;
(Continued)

(56) References Cited

U.S. PATENT DOCUMENTS 4,295,785 A    10/1981  Lardellier
4,699,254 A *  10/1987  Mery ............... F16D 55/2265
                                                    188/73.36
(Continued)

FOREIGN PATENT DOCUMENTS

CN    101372902 A    2/2009
CN    101550844 A    10/2009
(Continued)

OTHER PUBLICATIONS

U.S. Non-Final Office Action issued in connection with related U.S. Appl. No. 14/858,508 dated Mar. 28, 2017.
(Continued)

*Primary Examiner* — Alain Chau
(74) *Attorney, Agent, or Firm* — Dority & Manning, P.A.

(57) ABSTRACT

The present disclosure is directed to a retention assembly for a gas turbine component including a first and a second gas turbine wall respectively defining a first and a second surface. A retainer, positioned between the first and the second surfaces, includes a flange, which contacts the first surface. A plurality of fingers extends outwardly from the flange. A first finger portion extends away from the first turbine wall toward the second wall. A second finger portion connected to the first finger portion extends substantially parallel to the flange. The second finger portion of a first finger of the plurality of fingers is positioned in a first slot defined in the second surface. The second finger portion of a second finger of the plurality of fingers adjacent to the first finger is positioned on the second surface adjacent to the first slot.

20 Claims, 6 Drawing Sheets

(51) Int. Cl.
    *F01D 11/00*      (2006.01)
    *F02C 3/04*      (2006.01)
    *F01D 25/24*      (2006.01)

(52) U.S. Cl.
CPC .............. *F01D 25/246* (2013.01); *F02C 3/04* (2013.01); *F02C 7/20* (2013.01); *F05D 2220/32* (2013.01); *F05D 2230/64* (2013.01); *F05D 2240/11* (2013.01); *F05D 2240/12* (2013.01); *F05D 2240/24* (2013.01); *F05D 2240/35* (2013.01); *F05D 2260/30* (2013.01); *Y02T 50/672* (2013.01)

(58) Field of Classification Search
CPC ............. F05D 2240/11; F05D 2260/30; F05D 2230/64; F05D 2230/642; F23R 3/60; F02C 7/20; F02C 7/28; F02C 3/04; Y02T 50/672
See application file for complete search history.

(56) References Cited

U.S. PATENT DOCUMENTS

| | | | |
|---|---|---|---|
| 4,953,282 A | 9/1990 | Corsmeier et al. | |
| 5,188,507 A | 2/1993 | Sweeney | |
| 5,593,276 A | 1/1997 | Proctor et al. | |
| 5,762,472 A * | 6/1998 | Pizzi | F01D 11/005 415/135 |
| 6,296,443 B1 * | 10/2001 | Newman | F01D 9/042 415/189 |
| 6,431,555 B1 * | 8/2002 | Schroder | F01D 11/005 277/628 |
| 6,464,232 B1 * | 10/2002 | Marchi | F01D 11/005 277/630 |
| 6,726,448 B2 | 4/2004 | McGrath et al. | |
| 6,733,235 B2 | 5/2004 | Alford et al. | |
| 7,434,670 B2 | 10/2008 | Good et al. | |
| 8,985,944 B2 | 3/2015 | Shapiro et al. | |
| 9,051,846 B2 * | 6/2015 | Arilla | F01D 9/04 |
| 2003/0202876 A1 | 10/2003 | Jasklowski et al. | |
| 2006/0010879 A1 * | 1/2006 | Aumont | F01D 9/023 60/796 |
| 2009/0010755 A1 * | 1/2009 | Keller | F01D 21/045 415/197 |
| 2010/0104426 A1 | 4/2010 | Keller et al. | |
| 2011/0189009 A1 * | 8/2011 | Shapiro | F01D 11/12 415/209.3 |
| 2011/0236203 A1 | 9/2011 | Arilla et al. | |
| 2014/0255179 A1 * | 9/2014 | Fielding | F01D 9/041 415/208.2 |
| 2015/0354386 A1 * | 12/2015 | Chuong | F01D 25/30 415/182.1 |
| 2016/0161121 A1 | 6/2016 | Chang | |
| 2016/0177786 A1 | 6/2016 | Sippel et al. | |
| 2017/0044921 A1 | 2/2017 | Vetters et al. | |
| 2017/0081978 A1 | 3/2017 | Fitzpatrick et al. | |
| 2017/0081979 A1 | 3/2017 | Fitzpatrick et al. | |

FOREIGN PATENT DOCUMENTS

| | | |
|---|---|---|
| EP | 0017534 A1 | 10/1980 |
| FR | 2825782 A1 | 12/2002 |
| GB | 2486964 A | 7/2012 |
| JP | S57-59002 A | 4/1982 |
| JP | 2000-320306 A | 11/2000 |
| JP | 2004-332731 A | 11/2004 |
| JP | 2004-332736 A | 11/2004 |
| JP | 2008-157251 A | 7/2008 |
| JP | 2011-521144 A | 7/2011 |
| WO | 2010058137 A1 | 5/2010 |
| WO | 2013181231 A1 | 12/2013 |

OTHER PUBLICATIONS

Fitzpatrick et al., filed Sep. 18, 2015, U.S. Appl. No. 14/858,508.
Fitzpatrick et al., filed Sep. 18, 2015, U.S. Appl. No. 14/858,542.
Notification of Reasons for Refusal issued in connection with related JP Application No. 2016-173234 dated Jul. 4, 2017.
First Office Action and Search issued in connection with related CN Application No. 201610823401.6 dated Aug. 30, 2017.
First Office Action and Search issued in connection with related CN Application No. 201610822742.1 dated Aug. 30, 2017.
European Search Report and Opinion issued in connection with corresponding EP Application No. 16189266.6 dated Jan. 30, 2017.
European Search Report and Opinion issued in connection with related EP Application No. 16189270.8 dated Feb. 3, 2017.
European Search Report and Opinion issued in connection with related EP Application No. 16189260.9 dated Feb. 21, 2017.

* cited by examiner

CERAMIC MATRIX COMPOSITE RING SHROUD RETENTION METHODS-FINGER SEALS WITH STEPPED SHROUD INTERFACE

FIELD OF THE INVENTION

The present subject matter relates generally to a retention assembly for a gas turbine engine. More particularly, the present subject matter relates to a retention assembly for a stationary component in a gas turbine engine, such as a turbine shroud.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP and the LP turbines each include one or more turbine blades that extract kinetic energy and/or thermal energy from the combustion gases flowing therethrough. Each turbine blade typically includes a turbine shroud, which forms a ring or enclosure around the turbine blade. That is, each turbine shroud is positioned radially outward from and circumferentially encloses each corresponding turbine blade. In this respect, each turbine blade and each corresponding turbine shroud form a gap therebetween.

The components defining the hot gas path, such as the turbine shrouds, may be constructed a ceramic matrix composite material or another material capable of withstanding prolonged exposure to the hot combustion gases. The components positioned radially outward from the hot gas path, such as the turbine shroud mounts, typically experience lower temperatures than the components along the hot gas path. In this respect, these components may be constructed from suitable metallic materials.

Conventional retention systems typically used in gas turbine engines to radially and/or circumferentially couple components in gas turbine engines constructed from disparate materials (e.g., a ceramic matrix composite turbine shroud and a metallic turbine shroud mount) include numerous components. For example, such systems may include complex arrangements of pins and/or springs. This results in increased assembly time and cost when constructing the gas turbine. Accordingly, a retention assembly for radially and/or circumferentially coupling stationary components of a gas turbine engine having a reduced part count would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a retention assembly for a stationary gas turbine component. The retention assembly includes a first stationary gas turbine wall having a first surface and a second stationary gas turbine wall having a second surface that defines at least one slot therein. A retainer is positioned between the first surface and the second surface. The retainer includes a flange in contact with the first surface. A plurality of parallel fingers extends outwardly from the flange. Each of the plurality of parallel fingers includes a first finger portion extending away from the first stationary gas turbine wall toward the second stationary gas turbine wall. A second finger portion integrally connected to the first finger portion extends substantially parallel to the flange. The second finger portion of a first finger of the plurality of parallel fingers is positioned in a first slot of the at least one slot. The second finger portion of a second finger of the plurality of parallel fingers adjacent to the first finger is positioned on the second surface adjacent to the first slot.

In a further aspect, the present disclosure is directed to a gas turbine. The gas turbine includes a compressor, a combustion section, and a turbine section. The turbine section includes a first stationary wall having a first surface and a second stationary wall having a second surface that defines at least one slot therein. A retainer is positioned between the first surface and the second surface. The retainer includes a flange in contact with the first surface. A plurality of parallel fingers extends outwardly from the flange. Each of the plurality of parallel fingers includes a first finger portion extending away from the first wall toward the second wall. Each of the plurality of parallel fingers further includes a second finger portion integrally connected to the first finger portion and extending substantially parallel to the flange. A first finger of the plurality of parallel fingers is positioned in a first slot of the at least one slot, and a second finger of the plurality of parallel fingers adjacent to the first finger is positioned on the second surface adjacent to the first slot.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Figure 1:
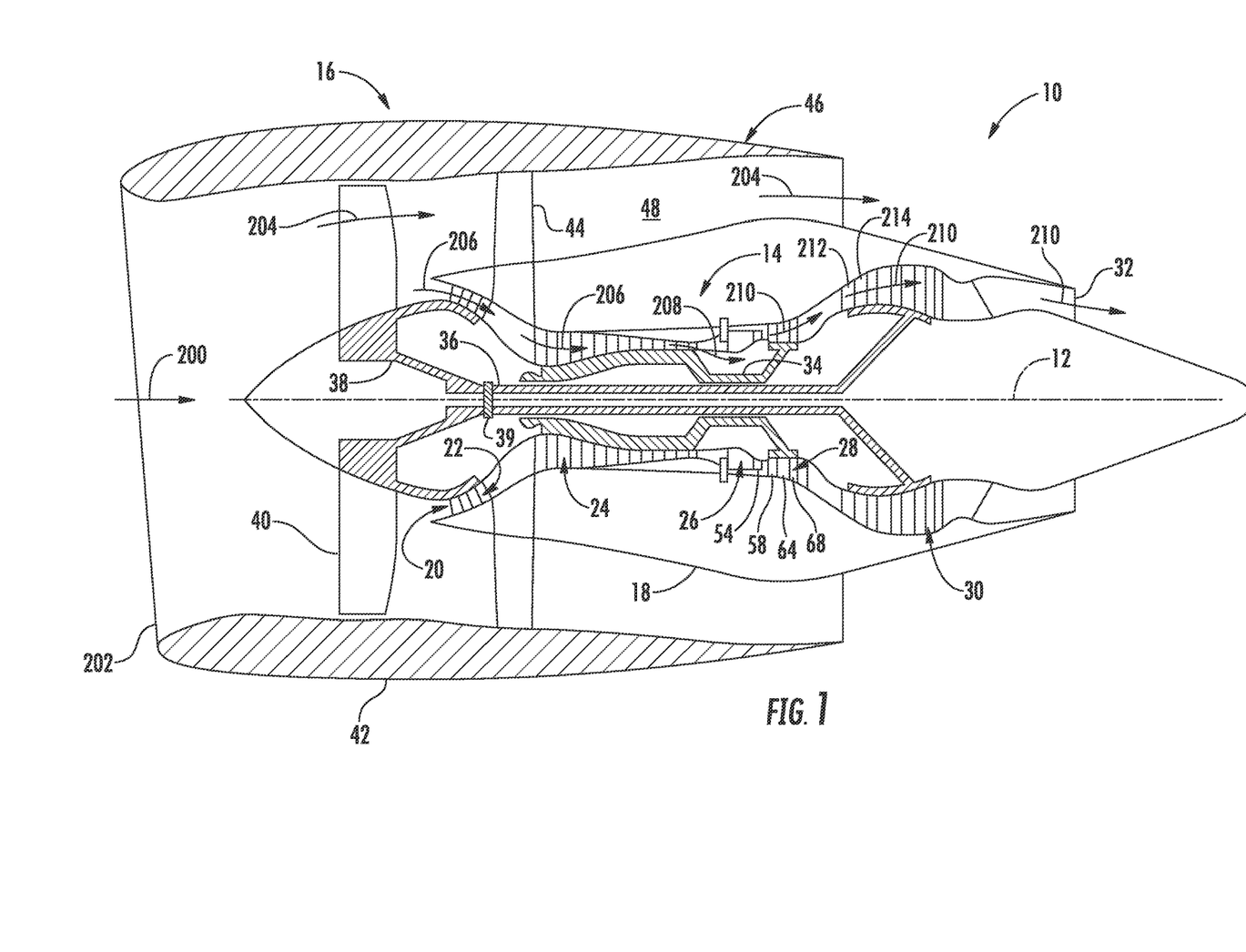
FIG. 1 is a schematic cross-sectional view of an exemplary high bypass turbofan jet engine in accordance with the embodiments disclosed herein.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" and may incorporate various embodiments of the present invention. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
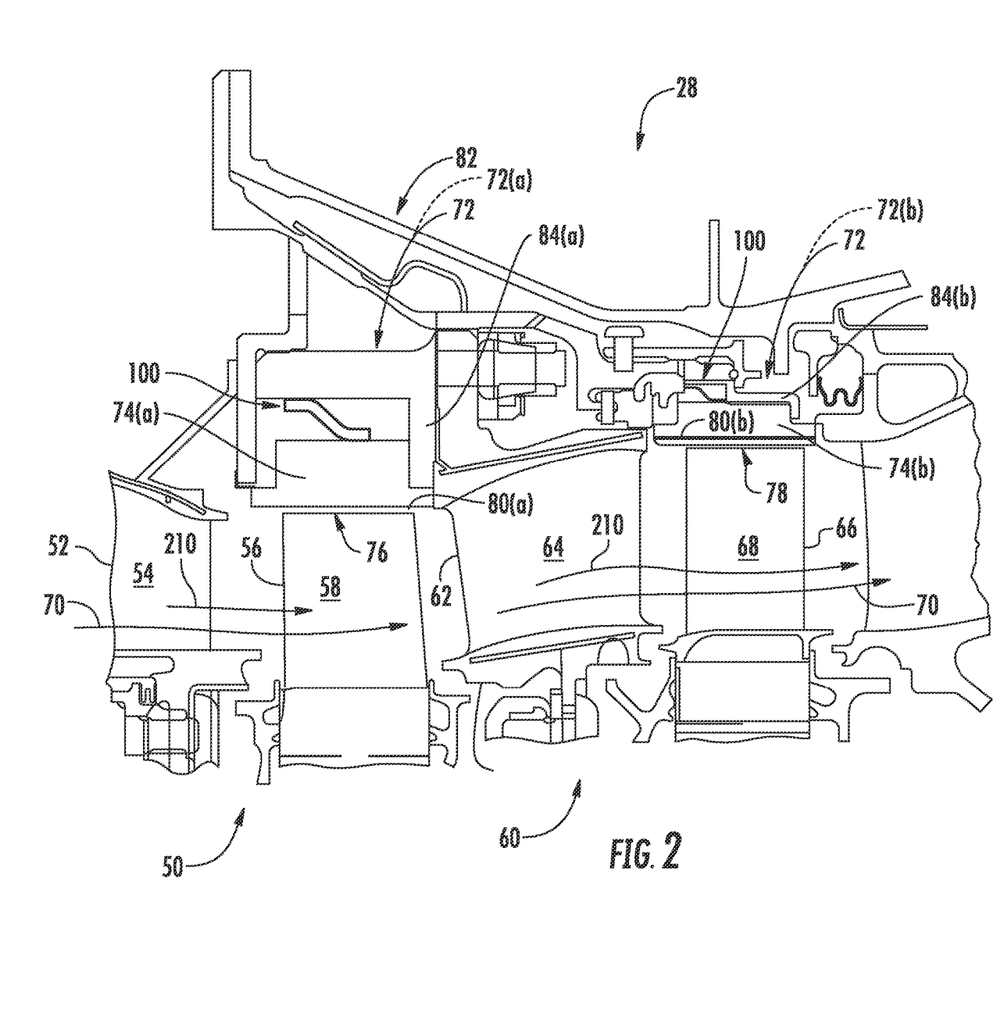
FIG. 2 is an enlarged cross sectional side view of a high pressure turbine portion of the gas turbine engine shown in FIG. 1, illustrating the location of a retention assembly in a high pressure (HP) turbine.

FIG. 2 is an enlarged cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68.

Each turbine shroud assembly 72(a), 72(b) may include a turbine shroud or shroud seal 74(a), 74(b) radially spaced from blade tips 76, 78 of the turbine rotor blades 58, 68. A retention assembly 100 connects each turbine shroud 74(a), 74(b) to a corresponding turbine shroud mount 84(a), 84(b). In particular, and as will be discussed in greater detail below, the retention assembly 100 circumferentially and radially retains each turbine shroud 74(a), 74(b) relative to each turbine shroud assembly 72(a), 72(b). The turbine shroud mount 84(a), 84(b) may connect to a casing 82 of the turbofan 10.

This arrangement forms clearance gaps between the blade tips 76, 78 and sealing surfaces or hot side surfaces 80(a), 80(b). As mentioned above, it is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps. In particular embodiments, at least one of the turbine shrouds 74(a), 74(b) may be formed as a continuous, unitary, or seamless ring.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and/or kinetic energy from the combustion gases 210. This energy extraction causes the LP shaft or spool 36 to rotate, thereby supporting operation of the LP compressor 22 and/or rotation of the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

Figure 3:
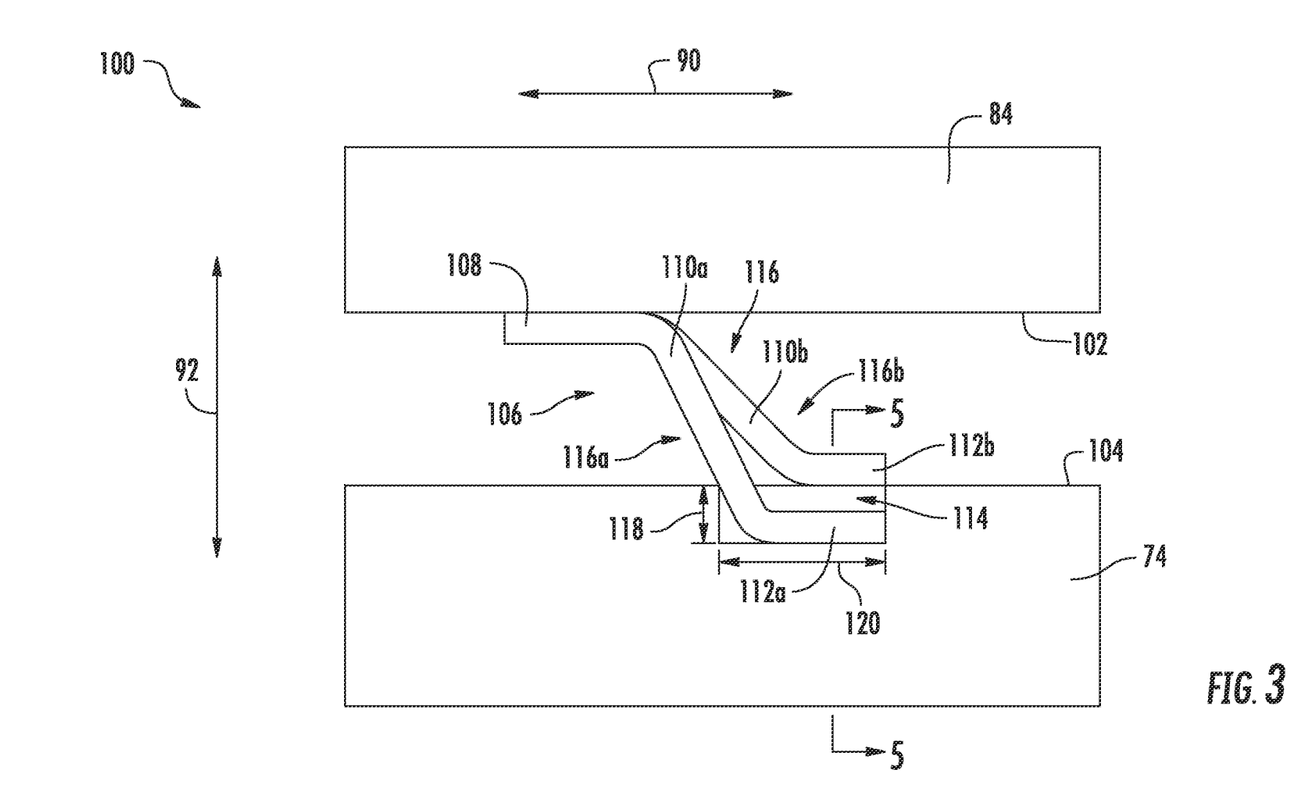
FIG. 3 is an enlarged cross-sectional side view of the retention assembly in accordance with the embodiments disclosed herein.
Figure 4:
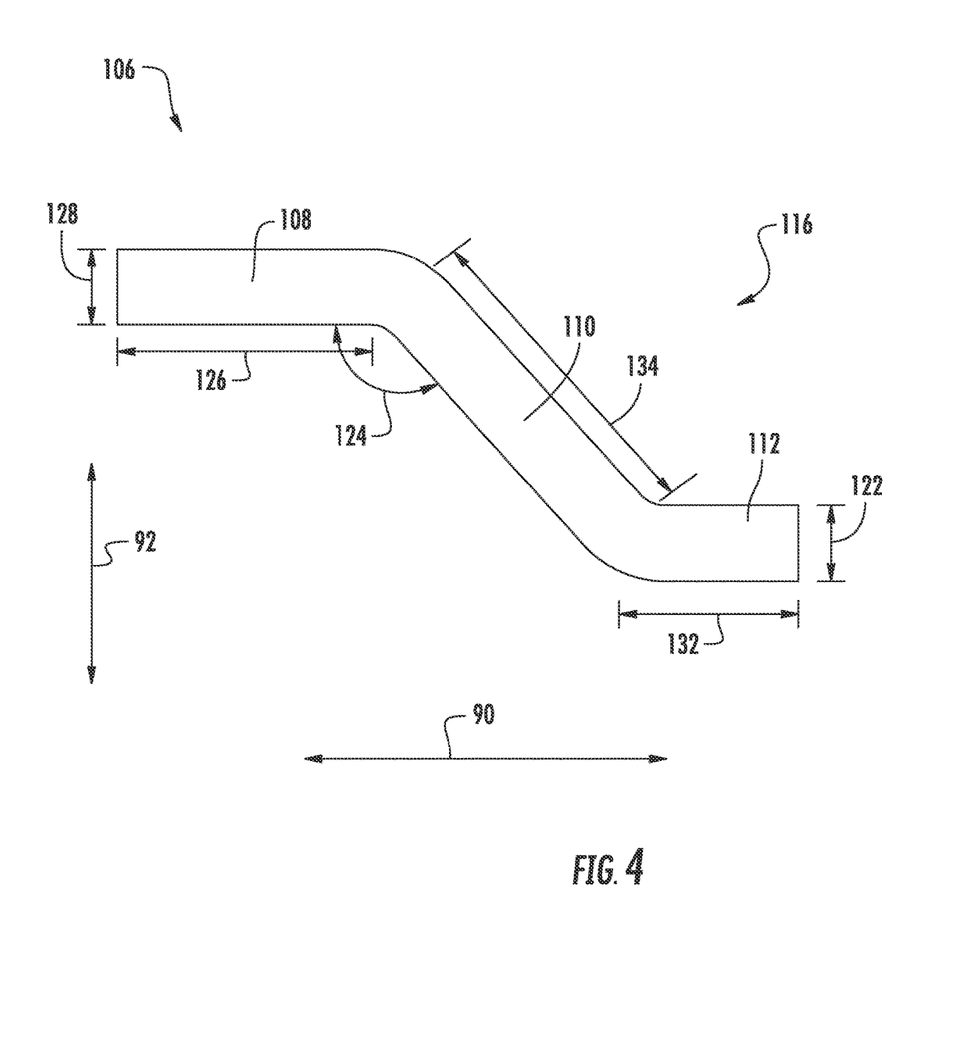
FIG. 4 is a side view of a retainer before installation in the gas turbine engine, illustrating the various geometric features thereof.
Figure 5:
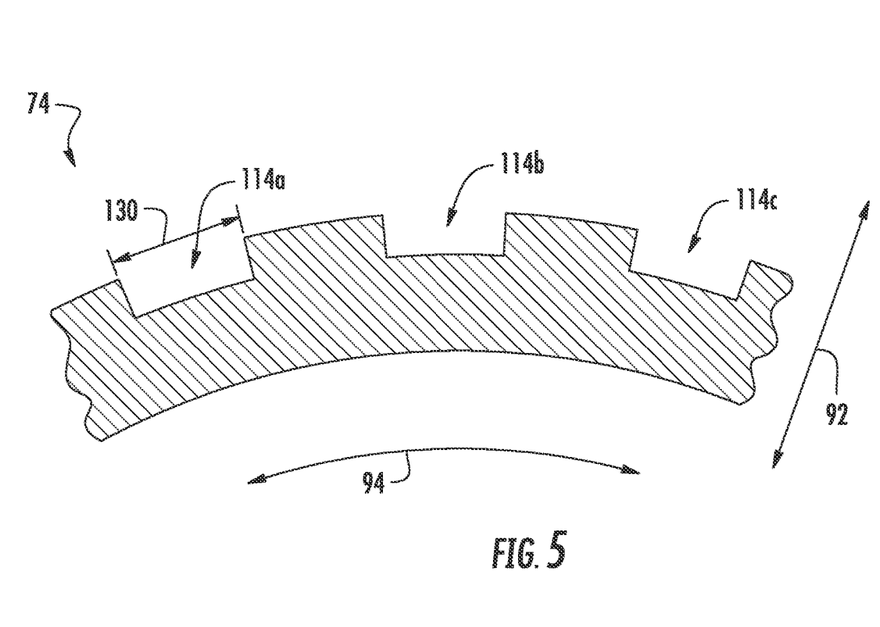
FIG. 5 is a cross-sectional view generally of the retention assembly without a retainer present taken generally about line 5-5 in FIG. 3, illustrating a plurality of slots in a radially outer surface of a turbine shroud.
Figure 6:
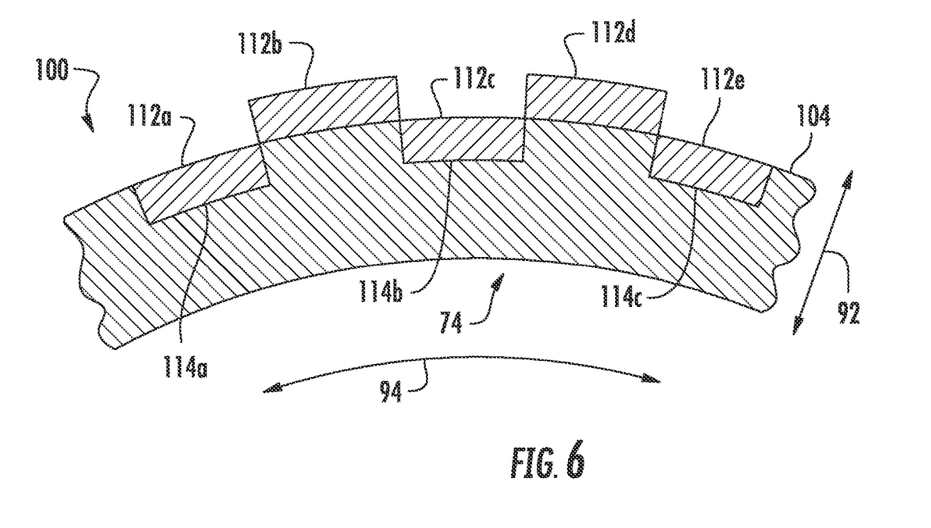
FIG. 6 is a cross-section view of the retention assembly with the retainer installed taken generally about line 5-5 in FIG. 3, illustrating several of a plurality of fingers each positioned in one of the plurality of slots.

FIGS. 3-6 illustrate the various components and features of the retention assembly 100. More specifically, FIG. 3 is a cross-sectional side view of one embodiment of the retention assembly 100 as disclosed herein. FIG. 4 is a side view of a retainer before installation in the turbofan 10. FIG. 5 is a cross-sectional view of the retention assembly 100 without a retainer installed, illustrating a plurality of slots in a turbine shroud. FIG. 6 is a cross-section view of the retention assembly retention assembly with the retainer installed, illustrating several of a plurality of fingers each positioned in one of the plurality of slots.

As illustrated in FIGS. 3-6, the retention assembly 100 defines an axial direction identified by an arrow 90, a radial direction identified by an arrow 92, and a circumferential direction identified by an arrow 94. In general, the axial direction extends along the longitudinal axis 12, the radial direction extends orthogonally outward from the longitudinal axis 12, and the circumferential direction extends concentrically around the longitudinal axis 12.

The retention assembly 100 secures a second gas turbine wall, such as a turbine shroud 74, to a first gas turbine wall, such as a turbine shroud mount 84. The turbine shroud mount 84 and the turbine shroud 74 may respectively be any of the turbine shroud mounts 84(a), 84(b), etc. or the turbine shrouds 74(a), 74(b), etc. in the turbofan 10. Although, the first and second gas turbine walls may be any other adjacent stationary components in the turbofan 10. The turbine shroud mount 84 includes a radially inner surface 102, and the turbine shroud 74 includes a radially outer surface 104. The turbine shroud mount 84 may be constructed from a metallic material, and the turbine shroud 74 may be constructed from a ceramic matrix composite.

As illustrated in FIGS. 3 and 5-6, the turbine shroud 74 defines at least one slot 114 extending radially inward from the radially outer surface 104. Preferably, the at least one slot 114 has a rectangular cross-section. In this respect, the at least one slot 114 includes a radial depth identified by arrow 118, an axial length identified by arrow 120, and a circumferential length identified by arrow 130 (FIG. 5). In one embodiment, the axial length and circumferential length are relatively greater than the radial depth. Nevertheless, the at least one slot 114 may have any suitable cross-sectional shape (e.g., circular, elliptical, pentagonal, etc.). In this case, the radial depth corresponds to the greatest dimension in the radial direction, the axial length corresponds to the greatest dimension in the axial direction, and the circumferential length corresponds to the greatest dimension in the circumferential direction. As will be discussed in greater detail below, the at least one slots should be sized and shaped to receive at least a portion of a finger 116.

Preferably, the turbine shroud 74 defines a plurality of slots 114. As illustrated in FIGS. 5-6, for example, the turbine shroud 74 may define a first slot 114a, a second slot 114b, and a third slot 114c. Although, the turbine shroud 74 may define more or less slots 114 as needed or desired. Each of the plurality of slots 114 is circumferentially spaced apart. In this respect, the plurality of slots 114 may be defined around the entirety of the turbine shroud 74 or simply a portion thereof (e.g., 180 degrees of the 360 degrees that the turbine shroud 74 may occupy in the circumferential direction). The plurality of slots 114 may be evenly circumferentially spaced apart (e.g., every 10 degrees) or unevenly spaced apart. For example, in some embodiments, the plurality of slots 114 may be divided into groups circumferentially spaced apart from one another (e.g., groups of three slots 114 spaced apart 30 degrees, wherein each of the three slots 114 in each group is spaced apart 10 degrees). Furthermore, each of the plurality of slots 114 may be axially aligned. Although, one or more of the plurality of slots 114 may be axially offset from the rest of the plurality of slots 114. In one embodiment, for example, every other one of the plurality of slots 114 may be axially offset from the slots 114 adjacent thereto.

As illustrated in FIG. 3, the retention assembly 100 includes at least one retainer 106 positioned between the turbine shroud mount 84 and the turbine shroud assembly 74. More specifically, the at least one retainer 106 may extend circumferentially around the entire turbine shroud 74. In one embodiment, a single retainer 106 may extend circumferentially around the entire turbine shroud 74. Alternately, a plurality of retainers 106 may extend circumferentially around the entire turbine shroud 74. In this respect, each of the retainers may be in contact with or spaced apart from the respective adjacent retainers 106. Nevertheless, the one or more retainers 106 may extend around only a portion of the turbine shroud 74 (e.g., 180 degrees of the 360 degrees that the turbine shroud 74 occupies in the circumferential direction). The retention assembly 100 may include as many or as few retainers 106 as is necessary or desired.

FIG. 4 illustrates the retainer 106 before installation into the turbofan 10. The retainer 106 includes a flange 108 for mating with the radially inner surface 102. The flange 108 may have a generally rectangular cross-section. In this respect, the flange 108 includes a radial thickness identified by arrow 128 and an axial length identified by arrow 126. In one embodiment, the axial length is relatively greater than the radial thickness. Nevertheless, the flange 108 may have any suitable cross-sectional shape (e.g., triangular, parabolic, etc.). In this case, the radial thickness corresponds to the greatest dimension in the radial direction and the axial length corresponds to the greatest dimension in the axial direction.

The retainer 106 further includes a plurality of generally parallel fingers 116 extending outward from the flange 108. More specifically, each of the plurality of fingers 116 includes a first finger portion 110 extending radially inward from and axially outward from the flange 108. In this respect, each of the first finger portions 110 forms an obtuse angle 124 with the flange 108. A second finger portion 112 extends axially outward from the first finger portion 110. In one embodiment, the flange 108 is positioned radially outward from, radially spaced apart from, and substantially parallel along the axial direction to the second finger portions 112. As such, the first finger portion 110 extends angularly between the flange 108 and the second finger portions 112.

Like the flange 108, the plurality of fingers 116 may have a generally rectangular cross-section. In this respect, the first finger portion 110 includes a length identified by arrow 134, and the second finger portion 110 includes a radial thickness identified by arrow 122 and an axial length identified by arrow 132. In one embodiment, the axial length of the second finger portions 112 is relatively greater than the radial thickness thereof. Nevertheless, the plurality of fingers 116 may have any suitable cross-sectional shape (e.g., triangular, parabolic, etc.). In this case, the radial thickness corresponds to the greatest dimension in the radial direction and the axial length corresponds to the greatest dimension in the axial direction. At least one of the second finger portions 112 of the plurality of fingers 116 may have a different axial length than at least one other of the second finger portions 112 of the plurality of fingers 116. Preferably, however, each of the plurality of fingers 116 preferably has the same first finger portion length, the second finger portion radial thickness, and second finger portion axial length. Furthermore, each of the plurality of fingers 116 and the flange 108 has the same constant cross-section shape and radial thickness 122, 128.

In the embodiment illustrated in FIG. 4, the obtuse angle 124 is substantially the same for each of the plurality of fingers 116 before the retainer 106 is installed in the turbofan 10. Nevertheless, at least one of the plurality of fingers 116 may have a different obtuse angle 124 than at least one other of the plurality of fingers 116.

In the embodiment illustrated in FIGS. 3-6, the plurality of fingers 116 includes five fingers 116. That is, FIG. 6 illustrates five second finger portions 112a, 112b, 112c, 112d, 122e corresponding to five fingers 116 (FIG. 3 only shows the fingers 116a, 116b). Nevertheless, as long as the plurality of fingers 116 includes at least two fingers 116, the plurality of fingers 116 may include as many fingers 116 as is desired or necessary.

The retainer 106 is preferably integrally formed (e.g., via stamping/bending, casting, etc.). That is, the flange 108 and each of the plurality of fingers 116 are integrally connected. Although, the flange 108 and/or each of the plurality of fingers 116 may be separated formed (e.g., stamped, casted, etc.) and permanently joined together (e.g., via welding, etc.).

The retainer 106 is preferably constructed from a suitable nickel or cobalt alloys. Suitable nickel and cobalt alloys include Rene 41® Alloy produced by General Electric Co. of Schenectady, N.Y., USA; WASPALOY® produced by United Technologies Corporation of Hartford, Conn., USA; HASTELLOY® X produced by Haynes International of Kokomo, Ind., USA; INCONEL® alloy 718 produced by Special Metal Corporation of New Hartford, N.Y., USA; and HAYNES® alloy 188 produced by Haynes International of Kokomo, Ind., USA.

When installed in the turbofan 10, the retainer 106 is positioned between the turbine shroud mount 84 and the turbine shroud 74. In this respect, the flange 108 contacts the radially inner surface 102 of the turbine shroud mount 84, and at least some the plurality of fingers 116 contacts the radially outer surface 104 of the turbine shroud 74. More specifically as illustrated in FIG. 3, at least one of the second finger portions 112a is positioned within the at least one slot 120, and at least one of the second finger portions 112b is positioned on the radially outer surface 104 adjacent to the at least one slot 114. In this respect, the second finger portion 112a is positioned radially inward from the second finger portion 112b. As such, the at least one slot 114 substantially prevents radial movement between the turbine shroud mount 84 and the turbine shroud 74.

The at least one slot 114 should be sized and shaped to accommodate the second finger portion 112a. Specifically, the axial length of the at least one slot 114 should be greater than the axial length of the second finger portion 112a to permit the second finger portion 112a to fit with the at least one slot 114. The cross-sectional shapes of the at least one slot 114 and the second finger portion 112a should be generally the same. In some embodiments, the radial depth of the at least one slot 114 may be greater than the radial thickness of the second finger portion 112a. As such, the second finger portion 112a located in the at least one slot 114 may be positioned radially inward from the radially outer surface 104.

Preferably, each of the second finger portions 112 alternate between being positioned in the slots 114 and on the radially outer surface 104. For example, and as illustrated in FIG. 6, the second finger portion 112a is positioned in the slot 114a, the second finger portion 112b is positioned on the radially outer surface 104 adjacent to the slot 114a, the second finger portion 112c is positioned in the slot 114b, the second finger portion 112d is positioned on the radially outer surface 104 adjacent to the slot 114b, and the second finger portion 112e is positioned in the slot 114c. Although, the second finger portions 112 may be positioned in the at least one slot 114 and on the radially outer surface 104 in any pattern.

The obtuse angle 124 and the length of the first finger portion 110a should be sized and configured to cause the retainer 106 to exert radially outward force on the turbine shroud mount 84 and radially inward force on the turbine shroud 74. More specifically, the flange 108 should exert radially outward force on the radially inner wall 102, the second finger portions 112 should exert radially inner force on the radially outer wall 104 and the at least one slot 114. In order to create these opposing radial forces, the flange 108 may flex radially inward and/or plurality of fingers 116 may flex radially outward upon installation of the retainer 106 in the turbine shroud. Each of the plurality of fingers 116 having the second finger portion 112 positioned on the radially inner surface 104 may flex radially outward more than each of the plurality of fingers 116 positioned in the at least one slot 114. In this respect, the retainer 106 substantially prevents radial movement between the turbine shroud mount 84 and the turbine shroud 74. That is, the opposing forces exerted by the retainer 106 substantially prevent radial movement between the turbine shroud mount 84 and the turbine shroud 74.

The retainer 106 also radially centers the turbine shroud 74 circumferentially within the turbine shroud mount 84. That is, the opposing radially forces align the turbine shroud 74 in the center of an opening defined by the turbine shroud mount 84. In this respect, the retainer 106 will re-align the turbine shroud 74 within the turbine shroud mount 84 if the turbine shroud 84 moves out of center due to, e.g., turbulence or other disturbances that jar the turbofan 10 during operation.

As discussed in greater detail above, the retention assembly 100 at least radially and circumferentially positions and retains a stationary gas turbine wall, such as the turbine shroud 74, relative to an adjacent stationary gas turbine wall, such as the turbine shroud mount 84. Furthermore, the retention assembly 100 may, in at least some embodiments, use only the retainer 106, which may be integrally formed, to do so. In this respect, the retention system 100 provides a reduced part count compared to conventional gas turbine retention systems. As such, the retention assembly 100 reduces assembly time and cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A retention assembly for a stationary gas turbine component of a gas turbine, comprising:
    a first stationary gas turbine wall comprising a first surface;
    a second stationary gas turbine wall comprising a second surface and defining at least one slot in the second surface; and
    a retainer positioned between the first surface and the second surface, the retainer comprising:
        a flange in contact with the first surface; and
        a plurality of parallel fingers extending outwardly from the flange in the same axial direction, each of the plurality of parallel fingers comprising:
            a first finger portion extending away from the first stationary gas turbine wall toward the second stationary gas turbine wall; and
            a second finger portion integrally connected to the first finger portion and extending substantially parallel to the flange;
        wherein the second finger portion of a first finger of the plurality of parallel fingers is positioned in a first slot of the at least one slot and the second finger portion of a second finger of the plurality of parallel fingers adjacent to the first finger is positioned on the second surface adjacent to the first slot, wherein the second finger portion of the first finger and the second finger portion of the second finger are each radially spaced apart from the flange, and
        wherein the first finger and the second finger of the plurality of fingers are circumferentially spaced with respect to a rotational axis of the gas turbine.

2. The retention assembly of claim 1, wherein the first stationary gas turbine wall is a turbine shroud mount and the second stationary gas turbine wall is a turbine shroud, and wherein the first slot of the at least one slot is circumferentially adjacent to the second surface.

3. The retention assembly of claim 2, wherein the flange is positioned radially outward from and radially spaced apart from the turbine shroud.

4. The retention assembly of claim 1, wherein the at least one slot comprises a plurality of circumferentially spaced apart slots.

5. The retention assembly of claim 1, wherein a radial depth of the at least one slot is relatively greater than a radial thickness of the plurality of parallel fingers.

6. The retention assembly of claim 1, wherein the plurality of parallel fingers extends radially inward from the flange at an obtuse angle.

7. The retention assembly of claim 6, wherein the obtuse angle and the first finger portion cause the retainer to exert radially outward force on the first stationary gas turbine wall and radially inward force on the second stationary gas turbine wall.

8. The retention assembly of claim 1, wherein the second finger portion of the first finger is positioned radially inward from the second finger portion of the second finger.

9. The retention assembly of claim 8, wherein the second finger portion of the first finger is positioned radially inward from the second surface.

10. The retention assembly of claim 1, wherein the flange is axially and radially spaced apart from the second finger portion of each of the plurality of parallel fingers.

11. A gas turbine, comprising:
    a compressor;
    a combustion section;
    a turbine section comprising:
        a first stationary wall comprising a first surface;
        a second stationary wall comprising a second surface and defining at least one slot in the second surface; and
        a retainer positioned between the first surface and the second surface, the retainer comprising:
            a flange in contact with the first surface; and
            a plurality of parallel fingers extending outwardly from the flange in the same axial direction, each of the plurality of parallel fingers comprising:
                a first finger portion extending away from the first stationary wall toward the second stationary wall; and
                a second finger portion integrally connected to the first finger portion and extending substantially parallel to the flange;
            wherein a first finger of the plurality of parallel fingers is positioned in a first slot of the at least one slot, and a second finger of the plurality of parallel fingers adjacent to the first finger is positioned on the second surface circumferentially adjacent to the first slot, wherein the second finger portion of the first finger and the second finger portion of the second finger are each radially spaced apart from the flange, and
        wherein the first finger and the second finger of the plurality of fingers are circumferentially spaced with respect to a rotational axis of the gas turbine.

12. The gas turbine of claim 11, wherein the first stationary wall is a turbine shroud mount and the second stationary wall is a turbine shroud.

13. The gas turbine of claim 12, wherein the flange is positioned radially outward from and radially spaced apart from the turbine shroud.

14. The gas turbine of claim 11, wherein the at least one slot comprises a plurality of circumferentially spaced apart slots.

15. The gas turbine of claim 11, wherein a radial depth of the at least one slot is relatively greater than a radial thickness of the plurality of parallel fingers.

16. The gas turbine of claim 11, wherein the plurality of parallel fingers extends radially inward from the flange at an obtuse angle.

17. The retention assembly of claim 16, wherein the obtuse angle and the first finger portion cause the retainer to exert radially outward force on the first stationary gas turbine wall and radially inward force on the second stationary gas turbine wall.

18. The gas turbine of claim 11, wherein the second finger portion of the first finger is positioned radially inward from the second finger portion of the second finger.

19. The gas turbine of claim 18, wherein the second finger portion of the first finger is positioned radially inward of the second surface.

20. The gas turbine of claim 11, wherein the flange is axially and radially spaced apart from the second finger portion of each of the plurality of parallel fingers.

* * * * *